Patented June 9, 1936

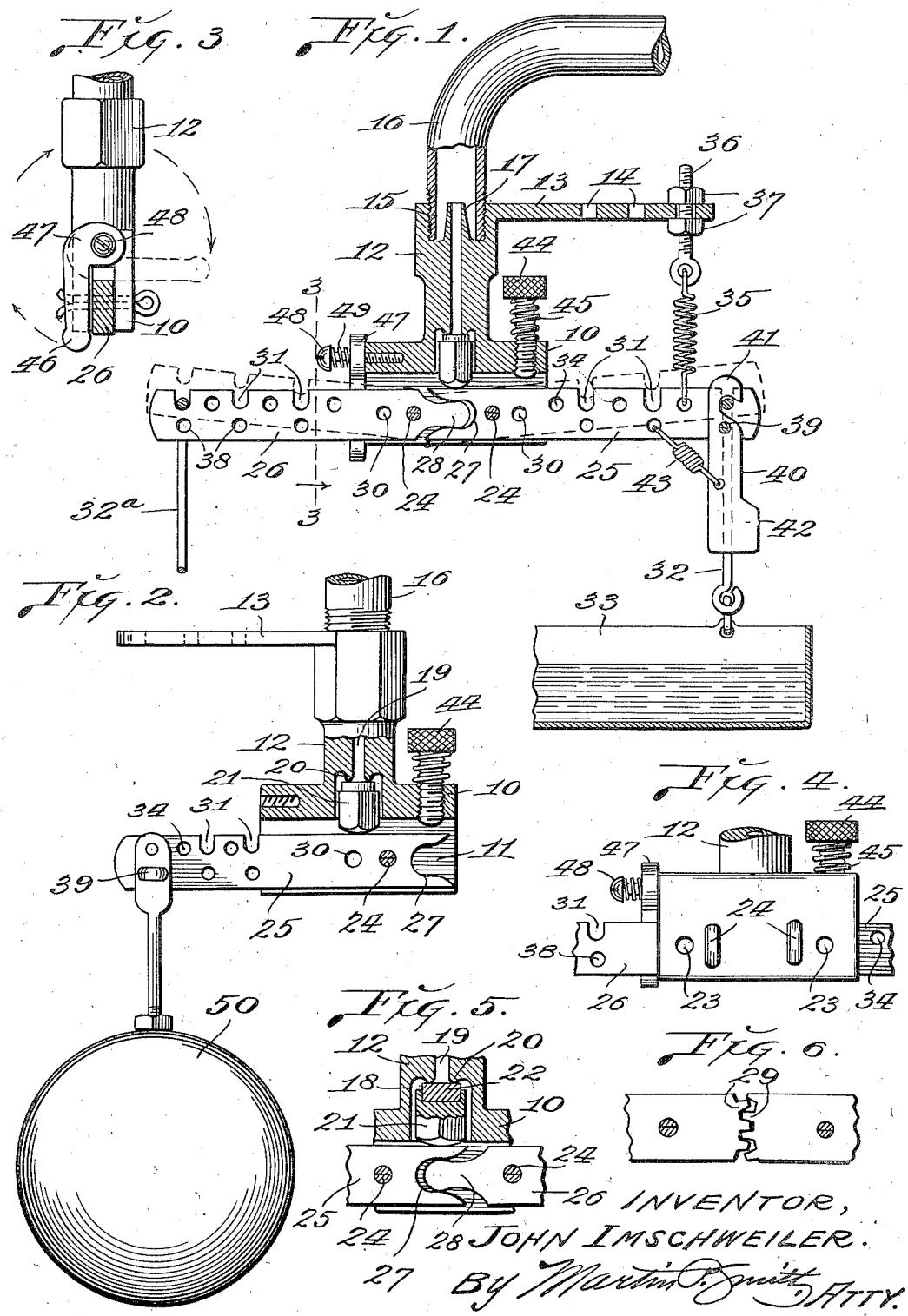

2,043,477

UNITED STATES PATENT OFFICE 2,043,477

AUTOMATIC POULTRY FOUNTAIN VALVE

John Imschweiler, Inglewood, Calif.

Application December 14, 1932, Serial No. 647,081

8 Claims. (Cl. 251—134)

My invention relates to an automatic poultry fountain valve of the same general type as disclosed in U. S. Letters Patent No. 1,415,178, issued to me May 9th, 1922, and the principal objects of my present invention are, to generally improve upon and simplify the construction of the valve disclosed in my aforesaid patent as well as other existing forms of automatic valves for poultry fountains and further, to provide a poultry fountain valve that is entirely automatic in operation and having a wide range of adjustability in order to suit varying conditions of water pressure and the position of the water pan or trough.

Further objects of my invention are, to provide a poultry fountain valve having a packing member that is arranged so as to provide a water tight joint when the valve is closed, further, to provide a valve having a pair of interengaging and reversible levers so as to enable the trough to be hung on either side of the valve and to enable said valve to function properly, even though one lever should become broken, further, to provide simple and efficient means for regulating the flow of water through the valve, to construct the levers so that the same may be fulcrumed in different positions upon the valve housing and further, to provide means for supporting the pan or trough from different points on the levers.

Further objects of my invention are, to provide the valve housing with a sediment chamber so as to trap sand and other sediment before the same reaches the valve seat and the closure therefor, further, to provide simple and effective means for positively locking the valve in closed position and further, to provide a combined gravity and spring actuated latch for securing the bail or hanger for the pan or trough to its supporting lever.

With the foregoing and other objects in view, my invention consists in certain novel features of construction and arrangements of parts that will be hereinafter more fully described and claimed and illustrated in the accompanying drawing in which:

Fig. 1 is an elevational view of the automatic valve with the valve housing in vertical section.

Fig. 2 is an elevational view partly in section of the valve as it is used in connection with a float.

Fig. 3 is a vertical section taken on the line 3—3 of Fig. 1.

Fig. 4 is a side elevational view of the lower portion of the valve housing.

Fig. 5 is a detail section showing the gasket or packing member in the upper portion of the valve proper.

Fig. 6 is an elevational view of the adjacent ends of the pan or trough supporting levers and showing a modified construction thereof.

Referring by numerals to the accompanying drawing and particularly Figs. 1, 3, 4 and 5, which illustrate a preferred embodiment of my invention, 10 designates the main body of the valve which is substantially rectangular in form and provided in its lower portion with a longitudinally disposed slot 11 that is open at the bottom of the block.

Formed integral with and projecting upwardly from the central portion of the top of the block, is a substantially cylindrical member 12 and projecting horizontally from the upper portion of said member, is an arm 13, through which is formed a series of spaced apertures 14.

Formed in the upper portion of member 12, is an internally threaded recess 15 that receives the threaded end of a water supply pipe 16 and projecting upwardly from the central portion of the bottom of recess 15, is a concentrically arranged lug 17.

The space within the recess 15 surrounding the lug, constitutes a sediment chamber to receive sand and the like and thereby prevent the same from passing through the duct or port that is closed by the valve proper.

Formed in the upper central portion of block 10 and extending upwardly into the lower portion of member 12, is a valve chamber 18 and extending from the upper end of said chamber upwardly through member 12 and through lug 17, is a duct 19. An annular valve seat 20 is formed at the upper end of chamber 18 around the lower end of duct 19 and this seat is rounded or curved in both directions toward and away from the duct 19.

Fitting loosely within valve chamber 18, is a short vertically disposed lug 21 that forms the body of the valve proper, said lug being preferably square or non-circular in cross section and removably seated in the upper end of this valve body is a disc 22 of leather, rubber or fiber which is adapted to rest on the valve seat 20 and thereby close the lower end of duct 19.

Formed through the lower portion of block 10, between the center and ends thereof, are apertures 23 that are adapted to receive transversely disposed removable pins 24 that serve as fulcrums for the water pan or trough supporting levers. These levers are designated by the numerals 25 and 26 respectively and the inner portions of said levers occupy the slots 11 in the lower portion of block 10.

Lever 25 is provided in its inner end with a socket 27 that receives a short tongue or finger 28 that projects from the inner end of lever 26 and when the levers are properly assembled and positioned within the block, the lower end of valve 21 rests on the upper edge of lever 25.

In some instances, the interengaging finger and socket 28 and 27 may be dispensed with and the inner ends of the levers provided with inter-engaging teeth 29, as illustrated in Fig. 6.

The inner portions of levers 25 and 26 are provided with a plurality of apertures 30 for the reception of the fulcrum pins 24 and the provision of these apertures and the corresponding pairs of apertures 23 permits said levers to be fulcrumed at different longitudinal points upon block 10.

Formed in the upper edges of both levers 25 and 26 are spaced notches 31 for the reception of the bail or hanger 32 that supports the water pan or trough 33.

Formed through the upper portion of each lever 25 and 26, between the notches 31, are apertures 34, any one of which is adapted to receive the lower end of a retractile spring 35 and which latter tends to draw the outer end of the engaged lever upwardly as shown by dotted lines in Fig. 1, and to resist the weight of the pan or trough and its contents.

The upper end of spring 35 is connected to the lower end of a threaded rod 36 that passes through any one of the apertures 14 in arm 13 and positioned on said screw rod above and below said arm, are nuts 36. By adjusting these nuts, the tension of spring 35 may be accurately regulated.

Formed through levers 25 and 26, below the notches 31, are apertures 38, any one of which may receive a pin 39 that functions as a fulcrum for a vertically disposed latch 40, the upper end of which is provided with a hook 41 that is adapted to engage the bail 32 that occupies the adjacent notch 31, thereby securing the same to the lever from which the bail is suspended.

The lower portion of this latch 40 is increased in size to form a weight 42 that tends to retain the latch in vertical position with hook 41 engaged over the upper portion of the bail. To insure this position of the hook, a small retractile spring 43 may be arranged between the intermediate portion of the latch and the lever 25, as illustrated in Fig. 1 and which spring yieldingly resists swinging movement of the latch 40 that would otherwise tend to disengage the hook 41 from its position above the bail 32.

To limit the upward swinging movement of lever 25 and to regulate the drip or flow of water through the valve, a screw 44 is seated in the upper portion of block 10, above lever 25, and arranged on said screw between its head and the block, is a coil spring 45 that provides tension to hold the screw in its adjusted position.

By moving screw 44 downward a sufficient distance so that the upper edge of lever 25 engages the lower end of said screw before valve 21 is entirely closed, the drip flow of water through the valve may be very accurately regulated.

A short lever 46 is provided on one end with an eccentric head 47 and said head is fulcrumed on a pin or screw 48 that is seated in the end of block 10 above one of the levers, preferably the lever 26.

Interposed between the head of this lever and the head of the pin or screw 48, is an expansive spring 49 that exerts pressure against the head of the lever, thereby tending to hold the same in either one of its set positions.

When lever 46 occupies its normal vertical position, as illustrated in Figs. 1 and 3, the low portion of the eccentric head 47 is spaced apart from the upper edge of lever 26 so that the same is free to swing vertically upon its fulcrum and when the lever is swung upward and forward so as to occupy a horizontal position above the lever 26 as illustrated by dotted lines in Fig. 3, the high portion of the eccentric head of said lever engages the upper edge of lever 26 and retains the same in its lowermost position so as to secure the levers in position with the valve 21 closed so that no water may flow through the valve.

In Fig. 2 I have shown a float controlled valve and where such construction is employed, lever 26 is dispensed with and lever 25 is reversed in position so that the end provided with a notch 27 is positioned beneath the drip regulating screw 44.

The upper edge of lever 25 engages the lower end of valve body 21 and suspended from the outer end of said lever is a float 50 that rests on the surface of the body of water within the pan or trough and as the level of the water in the pan or trough lowers, the float will correspondingly lower, thereby swinging lever 25 on its fulcrum so as to permit valve 21 to open, with the result that water to replenish the supply in the pan or trough will flow downwardly past the open valve.

Practically all water that passes the valve will flow downwardly into the pan or trough positioned beneath the valve body and the levers that project from the ends thereof, but if any water passes lengthwise along lever 25 by adhesion, it will flow downwardly on latch 40 and drip into the pan or trough, thus preventing waste of water and likewise prevent the ground adjacent to the trough from becoming muddy.

Under normal conditions or with an ample supply of water in the pan or trough, the weight thereof impressed on the outer end of lever 25 holds the same so that the inner end of said lever presses the packing 22 carried by valve 21 against the seat 20, thereby closing the valve and cutting off the flow of water therethrough and as the water within the pan or trough is taken by the fowls and the weight of the trough and its contents are correspondingly decreased, the spring 35 will elevate the pan and lever 25 so as to switch the lower end of the lever downward, thereby permitting the valve 21 and packing 22 to leave the seat and permit additional water to flow into the pan or trough.

By providing the two levers 25 and 26, the pan or trough may be positioned so as to project in either direction from the valve and in the event that either lever should be broken, the remaining lever may be adjusted on the body of the valve so that the same will continue to function.

The packing member 22 carried by the upper end of the valve body 21 insures a fluid pressure tight joint for controlling the flow of water through the valve and as said packing member is readily removable from the body of the valve, it may be readily removed and replaced by a new packing member as the occasion demands.

Where the two levers 25 and 26 are used in connection with the valve, as illustrated in Fig. 1, a relatively short pan or trough may be suspended from the outer ends of both levers by utilizing a second bail or hanger 32ª which depends from the outer end of lever 26 and where such construction is employed the pan or trough is suspended in a horizontal plane and its vertical movement is uniform inasmuch as the weight of the pan and its contents is equally divided between the two levers 25 and 26.

By forming the counterbalancing weight 42 on the same side of latch 40 with the opening into the hook 41, said latch is overbalanced so as to cause the hook to swing toward and retain its position over the upper portion of the bail 32 that is engaged in the notch 31 and such arrangement counteracts any tendency of the bail to become disengaged from the lever until the latch and its hook are manually swung into position to disengage the hook from the bail.

Thus it will be seen that I have provided a poultry fountain valve that is entirely automatic in operation, capable of a wide range of adjustability so as to suit different conditions and which valve insures a constant supply of fresh water for the poultry at all times.

It will be understood that minor changes in the size, form and construction of the various parts of my improved automatic poultry fountain valve may be made and substituted for those herein shown and described without departing from the spirit of the invention, the scope of which is set forth in the appended claims.

I claim as my invention:

1. In an automatic poultry fountain valve, a valve housing having a duct, a valve for controlling the flow of water through said duct, a pair of interchangeable levers fulcrumed on said valve housing below said valve, one of which levers engages said valve, the inner ends of said levers having interengagement with each other and trough supporting members each adapted to be adjustably mounted on one of said levers and to hang suspended therefrom.

2. In an automatic poultry fountain valve, the combination with a fulcrumed valve actuating lever of a trough supporting bail suspended from said lever, and a latch pivoted on said lever for securing the bail thereto.

3. In an automatic poultry fountain valve as set forth in claim 2 and with a retractile spring arranged between said latch and lever.

4. In an automatic poultry fountain valve, the combination with a valve housing provided with a duct, of a valve for controlling the flow of water through said duct, a pair of interchangeable levers fulcrumed on said valve housing below said valve, one of which levers engages said valve, the inner ends of said levers having interengagement with each other, a retractile spring adjustably supported from the upper portion of the valve housing and connected at its lower end to one of said levers for yieldingly suspending the same, trough supporting members each adapted to be detachably and adjustably applied to one of said levers, a gravity actuated hook pivotally mounted on one of said levers for retaining one of said trough supporting members in engagement with the lever from which it is suspended and a retractile spring arranged between said gravity hook and the lever to which said hook is applied.

5. In an automatic poultry fountain valve, the combination with a valve housing provided with a duct, of a valve for controlling the flow of water through said duct, a pair of interchangeable levers fulcrumed on said valve housing below said valve, one of which levers engages said valve, the inner ends of said levers having interengagement with each other, a retractile spring adjustably supported from the upper portion of the valve housing and connected at its lower end to one of said levers for yieldingly suspending the same, trough supporting members each adapted to be detachably and adjustably applied to one of said levers, a gravity actuated hook pivotally mounted on one of said levers for retaining one of said trough supporting members in engagement with the lever from which it is suspended, a retractile spring arranged between said gravity hook and the lever to which said hook is applied and a spring pressed latch pivotally mounted on the valve housing and adapted to engage one of the levers to hold the same against swinging movement on its fulcrum.

6. In an automatic poultry fountain valve, the combination with a valve housing provided with a duct, of a valve for controlling the flow of water through said duct, a pair of interchangeable levers fulcrumed on said valve housing below said valve, one of which levers engages said valve, the inner ends of said levers having interengagement with each other, a retratcile spring adjustably supported from the upper portion of the valve housing and connected at its lower end to one of said levers for yieldingly suspending the same, trough supporting members each adapted to be detachably and adjustably applied to one of said levers, a gravity actuated hook pivotally mounted on one of said levers for retaining one of said trough supporting members in engagement with the lever from which it is suspended, a retractile spring arranged between said gravity hook and the lever to which said hook is applied, a spring pressed latch pivotally mounted on the valve housing and adapted to engage one of the levers to hold the same against swinging movement on its fulcrum and a screw seated in the valve housing for limiting the upward swinging movement of the outer portion of the other one of said levers.

7. In an automatic poultry fountain valve, the combination with a valve housing provided with a duct, a valve for controlling the flow of water through said duct, which valve opens by gravity, a pair of interchangeable levers fulcrumed on said housing below said valve, which levers project in opposite directions from their fulcrums, one of which levers engages said valve, the inner ends of said levers having interengagement with each other and both of said levers being provided with means for receiving a trough supporting member.

8. In an automatic poultry fountain valve, the combination with a valve housing provided with a duct, a valve for controlling the flow of water through said duct, which valve opens by gravity, a pair of interchangeable levers fulcrumed on said housing below said valve, which levers project in opposite directions from their fulcrums, one of which levers engages said valve, the inner ends of said levers having interengagement with each other, both of said levers being provided with means for receiving a trough supporting member and a latch mounted on the valve housing and movable into a position for limiting the movement of one of the levers in one direction upon its axis.

JOHN IMSCHWEILER.